Dec. 13, 1960    D. A. CUMMINGS    2,964,390
LIQUID MEASURING DEVICE
Filed Jan. 31, 1955
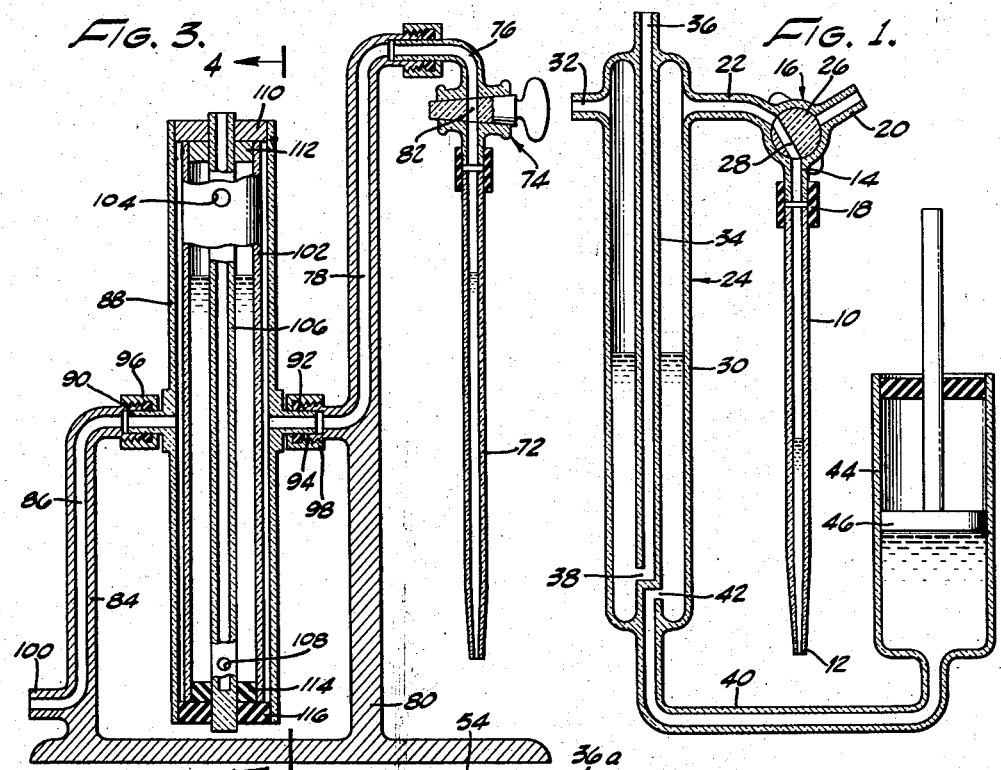
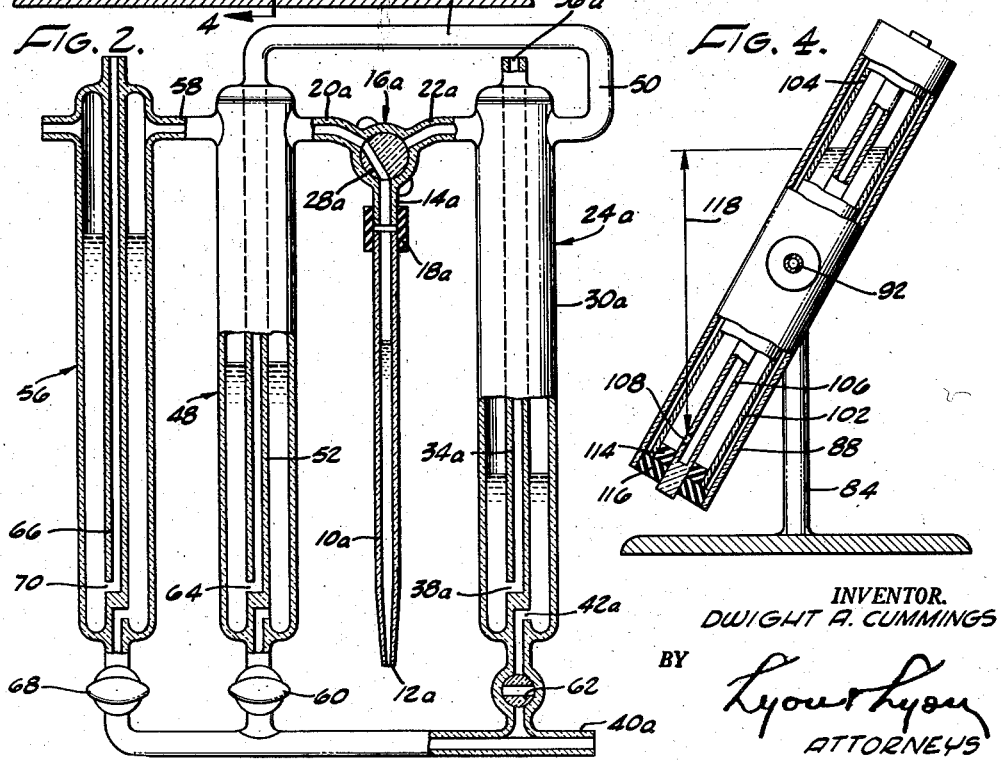
INVENTOR.
DWIGHT A. CUMMINGS
BY
Lyon & Lyon
ATTORNEYS

United States Patent Office 2,964,390
Patented Dec. 13, 1960

2,964,390

LIQUID MEASURING DEVICE

Dwight A. Cummings, 421 S. Marguerita St., Alhambra, Calif.

Filed Jan. 31, 1955, Ser. No. 485,212

2 Claims. (Cl. 23—259)

This invention relates to an improved liquid measuring device.

It is an object of this invention to provide a device for measuring and dispensing liquids in a definite predetermined quantity as in the case of pipetting or to an end point as in titrating.

It is a further object of this invention to provide a device for accurately measuring and dispensing a predetermined quantity of liquid more rapidly than heretofore has been possible as in pipetting or in titrating.

It is an object of this invention to provide a device for causing the function of a pipette or burette more rapidly and more accurately.

It is a further object of this invention to provide means for readily varying the quantity of liquid measured and dispensed.

Other objects and advantages will be readily apparent from the following description:

In the drawings:

Figure 1 is a side elevation partially in section of the first embodiment of this invention.

Figure 2 is a side elevation in section of the second embodiment form of the invention.

Figure 3 is a side elevation partially in section of the third embodiment of this invention.

Figure 4 is a section taken along line 4—4 of Figure 3.

It is readily apparent that all three modifications of this invention combine the same elements in the same manner to produce the same result with varying degrees of refinement. The embodiment illustrated in Figure 1 will be first described.

A pipette 10 is graduated and calibrated to indicate the volume of liquid contained therein. Liquid is admitted to the pipette by immersing the tip 12 thereof into the liquid to be measured and a reduced or less than atmospheric pressure applied to the other extremity of the pipette whereby liquid is forced upwardly in the hollow pipette.

The upper extremity of the pipette is in communication with one branch 14 of a stopcock 16 by means of a flexible tubing section 18. Another branch 20 of the stopcock 16 is vented to the atmosphere and a third branch 22 of the stopcock is in communication with a manostat 24. The rotatable valve element 26 of the stopcock has a port 28 therethrough communicating either branch 22 or branch 20 with branch 14 dependent upon its position.

The manostat 24 comprises an outer cylinder or housing 30, the interior of which is in communication with branch 22 and also port 32, which is connected to a suitable source of reduced pressure, such as a pump, so that when the stopcock communicates the pipette 10 with the manostat 24 liquid flows upwardly in the pipette.

Projecting through the upper extremity of outer cylinder 30 is a tube 34 which has its upper extremity vented to the atmosphere as at 36 and its lower extremity vented inside cylinder 30 as at 38. The lower extremity of cylinder 30 receives tube 40 which has one extremity vented inside cylinder 30 as at 42. The other extremity of tube 40 terminates in cylinder 44 and housing piston 46. The cylinder 44, tube 40 and part of cylinder 30 are filled with a suitable liquid. It is apparent that by moving piston 46 the level of the liquid in cylinder 30 can be varied.

In operation as the reduced pressure is applied to port 32, liquid is forced up into pipette 10. The height of the column of liquid in the pipette 10 above the surface in which tip 12 is immersed will be equal to the height of the liquid in cylinder 30 from the upper surface of the liquid to the opening 38. At this point the pressures of the vertical columns will balance.

Thus in cylinder 30 the portion above the liquid level is under reduced pressure while the air in tube 34 is at atmospheric pressure. Thus liquid is forced out of tube 34 into the cylinder 30. When the pressure of the column of liquid from its surface to opening 38, plus the reduced pressure in the upper portion of cylinder 30 equals atmospheric pressure, a state of balance is reached. If the sum of these two pressures is less than atmospheric pressure air will pass through opening 38 and in the form of bubbles pass through the liquid in cylinder 30. When the liquid in pipette 10 has reached a height from the surface in the pipette to the surface of the liquid in which tip 12 is immersed equal to the height of the liquid in cylinder 30 from the upper surface of the liquid to the opening 38, a balance is reached so that the liquid will be forced no higher in the pipette.

When the tip 12 is withdrawn from the liquid, some of the liquid flows from the tip, the distance being equal to the distance below the surface the tip extended.

By rotating the stopcock so that port 28 communicates the pipette 10 with the atmosphere, the liquid is discharged from the pipette.

Referring now to the embodiment of Figure 2, the same parts performing the same function are given the same numerical designation with the addition of the exponent "a." In this embodiment one stopcock branch 22a communicates with the inside of cylinder 30a of manostat 24a and the other branch 20a with a second manostat 48 which is constructed in the same manner as manostat 24a. However, the port 50 of manostat 24a is connected with tube 52 of manostat 48 by a conduit 54. The tube 34a is vented to the atmosphere at extremity 36a.

Each manostat 24a and 48 is communicated with tube 40a to receive liquid as in the previously described embodiment. Stopcocks 60 and 62 are provided to permit individual control of the level of liquid maintained in the two manostats in the connections between the manostats and tube 40a.

A third manostat 56 may be connected in parallel with manostat 48 by a conduit 58 to act as a pressure equalizer and safety valve in a manner which will hereinafter be described in greater detail.

Assuming a source of reduced pressure is applied directly to conduit 58 and the liquid level in manostat 48 is higher than the level of opening 64 and in manostat 24a of opening 38a, it is readily apparent if there is no liquid in manostat 24a the device functions as the previous embodiment, both tube 52 and branch 22a being vented to the atmosphere. When liquid has been introduced into the manostat 24a above the level of opening 38a and the tip 12a of pipette 10a is immersed in the liquid to be transferred, liquid will be forced upwardly into the pipette 10a in the same manner as the previous embodiment to a distance above the lower or delivered mark on the pipette equal to the distance tip 12a is immersed in the liquid when stopcock 16a communicates the pipette with the interior of this manostat. The level of liquid in manostat 24a controls the height of liquid in the pipette. If the stopcock 16a is turned so that pipette 10a is communicated with the interior chamber of manostat 48, with the source of reduced pressure connected to the interior chamber of manostat 48, the liquid in which tip 12a is immersed will be forced up pipette 10a a distance equal to the height of the column of liquid in manostat 24a from its surface to opening 38a plus the height of the column of liquid from its surface to the opening 64 in tube 52 of manostat 48 above the surface of the liquid in which tip 12a is immersed. This is caused by the fact that the pressure in tube 52 is below atmospheric pressure an amount equal to the pressure of the column of liquid between opening 38a and the surface of liquid in manostat 24a.

With the liquid column in the pipette at the upper or filled position, tip 12a is withdrawn from the liquid to be measured and transferred, the column falls a distance equal to the distance the tip 12a was immersed. The stopcock 16a is then turned to communicate pipette 10a with the interior of manostat 24a. The liquid column in the pipette then falls to the lower or delivered mark. The operation can then be repeated indefinitely accurately measuring and delivering a predetermined volume of liquid. The volume of liquid measured and transferred can be readily varied varying the height of liquid in either or both manostats 24a and 48, and, of course, by varying the internal diameter of the pipette 10a, since the height of the column of liquid in the pipette is fixed by the height of the liquid in the manostats.

The manostats 24a and 48 are connected in series. The manostat 56 is connected in parallel with manostat 48, that is, their inner chambers are in communication by conduit 58. Tube 66 is vented to the atmosphere and a suitable conduit having a stopcock 68 connects the chamber of manostat 56 with the liquid source tube 40a admitting liquid into the manostat chamber. As previously described if the sum of the air pressure in manostat 56 and the pressure of the column of liquid therein from the surface thereof to opening 70 falls below atmospheric pressure air bubbles through the liquid from tube 66 to increase the air pressure in the manostat. Thus the height of the liquid in manostat 56 controls the amount that air pressure can be reduced in manostat 48 thereby acting as a safety valve.

The third embodiment of this invention is illustrated in Figures 3 and 4. A pipette 72 is fixed to one branch of a stopcock 74 with the other branch 76 of the stopcock fixed to port 78 of stand 80. The stopcock is rotatable so that its port 82 communicates pipette 72 with port 78 or breaks this communication.

The stand 80 has an arm 84 containing port 86 which terminates at the same level as port 78. A shell 88 has a pair of opposed ported projections 90 and 92 which fit into the terminal of arm 84 and of projection 94 of stand 80 at the terminal of port 78 whereby the shell 88 is pivotally mounted in the stand. Suitable packing members 96 and 98 prevent leakage. Thus a source of reduced pressure attached at terminal 100 of arm 84 is in communication with port 78 through shell 88. Within shell 88 a cylinder 102 is mounted having an aperture 104 adjacent its upper extremity. Mounted within cylinder 102 is a tube 106 having an aperture 108 adjacent its lower extremity. Suitable stoppers 110, 112, 114 and 116 hold the tube 106 and cylinder 102 in position while preventing leakage.

When liquid is introduced in cylinder 102 above the level of aperture 108 of tube 106 and below the level of aperture 104 of cylinder 102 and a source of reduced pressure applied at 100 with the stopcock turned to communicate port 78 with pipette 72, the device operates as in the first described embodiment. Thus, with the tip of pipette 72 immersed in a liquid the liquid is forced up the pipette to a level above the level of the surface of the liquid in which the tip is immersed equal to the height of the surface of liquid above aperture 108 in cylinder 102 before a balance is reached.

It becomes apparent therefore if the effective height of the surface of liquid in cylinder 102 is reduced with respect to aperture 108, that liquid will flow from pipette 72 until a state of balance is reached. This can be accomplished by pivoting the shell 88 as illustrated in Figure 4. The arrow 118 designates the effective height of the liquid in cylinder 102 between the surface of the liquid therein and aperture 108 along the direction of gravity. Thus when the pipette is filled the shell 88 is closer to vertical than after discharge. The amount of liquid measured and discharged thus can be varied from a maximum when the shell is pivoted from vertical to horizontal to any lesser amount by controlling the starting and terminating points of pivoting.

The above description contemplates that the specific gravity of the fluid within the manostats and in the pipette is the same. If the specific gravities are different the height of the column in the pipette will, of course, vary in accordance with this difference. However, the manostats and pipettes can be calibrated accordingly.

While what hereinbefore has been described is the preferred embodiment of this invention, it is readily apparent that alterations and modifications can be resorted to without departing from the scope of this invention and such alterations and modifications are intended to be included within the scope of the appended claims.

I claim:

1. In a device adapted to be actuated by a source of suction pressure for measuring a quantity of liquid the combination of: a tube, a platform, a housing, means for pivotally mounting the housing upon said platform, means communicating said tube and the interior of said housing, means connecting the interior of said housing with said source of suction pressure, and a second tube projecting through said housing and having an opening therein within said housing.

2. In a device adapted to be actuated by a source of suction pressure for measuring a quantity of liquid the combination of: a tube, a platform, a shell pivotally mounted upon said platform, means communicating said shell to said tube, means communicating said shell to said source of suction pressure, a housing within said shell having an aperture therein, and a second tube open to the atmosphere passing through said shell and housing and having an opening therein spaced from the aperture in said housing.

References Cited in the file of this patent
UNITED STATES PATENTS

| | | |
|---|---|---|
| 1,736,392 | Coss et al. | Nov. 19, 1929 |
| 2,158,102 | Betzold et al. | May 16, 1939 |
| 2,271,144 | McKay | Jan. 27, 1942 |
| 2,585,314 | Hazeltine et al. | Feb. 12, 1952 |
| 2,606,690 | Hansen | Aug. 12, 1952 |
| 2,677,480 | Wiczer | May 4, 1952 |
| 2,732,985 | Howard | Jan. 31, 1956 |